United States Patent
Shen et al.

(10) Patent No.: US 11,720,814 B2
(45) Date of Patent: Aug. 8, 2023

(54) METHOD AND SYSTEM FOR CLASSIFYING TIME-SERIES DATA

(71) Applicant: Samsung Electronics Co., Ltd., Suwon-si (KR)

(72) Inventors: Yilin Shen, Sunnyvale, CA (US); Yue Deng, Sunnyvale, CA (US); Hongxia Jin, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1213 days.

(21) Appl. No.: 16/234,433

(22) Filed: Dec. 27, 2018

(65) Prior Publication Data

US 2019/0205786 A1 Jul. 4, 2019

Related U.S. Application Data (60) Provisional application No. 62/612,203, filed on Dec. 29, 2017.

(51) Int. Cl.
   *G06N 20/00* (2019.01)
   *G06F 18/24* (2023.01)
   *G06V 10/764* (2022.01)
   *G06N 3/049* (2023.01)

(52) U.S. Cl.
   CPC ............ *G06N 20/00* (2019.01); *G06F 18/24* (2023.01); *G06V 10/764* (2022.01); *G06N 3/049* (2013.01)

(58) Field of Classification Search
   CPC ........ G06N 20/00; G06N 3/049; G06N 3/082; G06K 9/6267; G06K 9/6256
   See application file for complete search history.

(56) References Cited

U.S. PATENT DOCUMENTS

| | | | | |
|---|---|---|---|---|
| 10,841,724 | B1* | 11/2020 | Tran | H04S 7/304 |
| 10,853,372 | B1* | 12/2020 | Mueen | G06F 16/24568 |
| 11,281,994 | B2* | 3/2022 | Lei | G06N 20/00 |
| 2008/0319951 | A1* | 12/2008 | Ueno | G06F 16/285 |
| | | | | 707/E17.046 |
| 2012/0323501 | A1* | 12/2012 | Sarrafzadeh | A61B 5/6804 |
| | | | | 702/41 |
| 2015/0120959 | A1* | 4/2015 | Bennett | H04L 47/10 |
| | | | | 709/233 |
| 2017/0003352 | A1* | 1/2017 | Barre | G01R 31/007 |
| 2017/0124480 | A1 | 5/2017 | Sarkar et al. | |
| 2017/0352204 | A1* | 12/2017 | Huet | G06N 5/04 |

(Continued)

FOREIGN PATENT DOCUMENTS

| CN | 101477619 B | 5/2012 |
|---|---|---|
| CN | 105184325 A | 12/2015 |

(Continued)

OTHER PUBLICATIONS

Shen et al., "Searching Time Series with Invariance to Large Amounts of Uniform Scaling" May 2017, pp. 111-114. (Year: 2017).*

(Continued)

*Primary Examiner* — Vincent Gonzales
(74) *Attorney, Agent, or Firm* — Sherman IP LLP; Kenneth L. Sherman; Steven Laut (57) ABSTRACT

A recognition method includes retrieving an input including data of a first window size. The method further includes classifying the input based on comparison of warping distance of the input with a pruning threshold.

20 Claims, 8 Drawing Sheets

(56) References Cited

U.S. PATENT DOCUMENTS

| | | | |
|---|---|---|---|
| 2018/0018533 A1* | 1/2018 | Taranta, II | G06F 3/04883 |
| 2018/0330201 A1* | 11/2018 | Witbrock | G06N 20/00 |
| 2019/0121951 A1* | 4/2019 | Nassi | G06F 21/32 |

FOREIGN PATENT DOCUMENTS

| | | | | |
|---|---|---|---|---|
| CN | 106295711 A | * | 1/2017 | |
| CN | 106354252 A | * | 1/2017 | G06F 3/017 |
| CN | 104063467 B | * | 4/2017 | G06F 16/2474 |
| CN | 106777980 A | * | 5/2017 | |
| CN | 107169411 B | * | 10/2019 | G06F 3/017 |
| CN | 106228002 B | * | 11/2021 | G06F 19/3418 |
| JP | 4785975 B2 | | 10/2011 | |
| KR | 20130075403 A | | 7/2013 | |
| WO | WO-2011154816 A2 | * | 12/2011 | G06F 1/3209 |
| WO | 2017058913 A1 | | 4/2017 | |

OTHER PUBLICATIONS

Shen et al., "Accelerating Time Series Searching with Large Uniform Scaling" May 2018, pp. 234-242. (Year: 2018).*
Cuturi et Blondel "Soft-DTW: a Differentiable Loss Function for Time-Series" Mar. 5, 2017, arXiv: 1703.01541v1, pp. 1-27. (Year: 2017).*
Paparrizos et Gravano, "Fast and Accurate Time-Series Clustering" Jun. 2017, pp. 1-49. (Year: 2017).*
Begum et al., "A General Framework for Density Based Time Series Clustering Exploiting a Novel Admissable Pruning Strategy" Dec. 2, 2016, pp. 1-19, arXiv: 1612.00637. (Year: 2016).*
Jain, Brijnesh "Warped-Linear Models for Time Series Classification" Nov. 24, 2017 arXiv: 1711.09156v1, pp. 1-33. (Year: 2017).*
Shokoohi-Yekta et al., "Generalizing DTW to the multi-dimensional case requires an adaptive approach" Feb. 15, 2016, pp. 1-31. (Year: 2016).*
Soheily-Khah et al., "Sparsification of the Alignment Path Search Space in Dynamic Time Warping" Nov. 13, 2017, arXiv 1711.04453v1, pp. 1-18. (Year: 2017).*
Su et Hua "Order-preserving Wasserstein Distance for Sequence Matching" Nov. 9, 2017, pp. 2906-2914. (Year: 2017).*
Neamtu et al., "Interactive Time Series Exploration Powered by the Marriage of Similarity Distances" Nov. 1, 2016, pp. 169-180. (Year: 2016).*
Dau et al., "Semi-Supervision Dramatically Improves Time Series Clustering under Dynamic Time Warping" Oct. 2016, pp. 999-1008. (Year: 2016).*
Jain et Schultz "Asymmetric Learning Quantization for Efficient Nearest Neighbor Classification in Dynamic Time Warping Spaces" Mar. 24, 2017, arXiv: 1703.08403v1, pp. 1-17. (Year: 2017).*
Begum et al., "Accelerating Dynamic Time Warping Clustering with a Novel Admissable Pruning Strategy" Aug. 2015, pp. 49-58. (Year: 2015).*
Gong et al., "Dynamic State Warping" Mar. 3, 2017, arXiv: 1703.01141v1, pp. 1-15. (Year: 2017).*
Iwana et al., "Dynamic Weight Alignment for Convolutional Neural Networks" Dec. 18, 2017, arXiv: 1712.06530v1 pp. 1-14. (Year: 2017).*
Zheng et al., "Exploiting multi-channels deep convolutional neural networks for multivariate time series classification" 2016, pp. 96-112. (Year: 2016).*
Zhao, Jiaping "shapeDTW: shape Dynamic Time Warping" Jun. 6, 2016, arXiv: 1606.01601v1, pp. 1-14. (Year: 2016).*
Ding H, Trajcevski G, Scheuermann P, Wang X, Keogh E. Querying and mining of time series data: experimental comparison of representations and distance measures. Proceedings of the VLDB Endowment. Aug. 1, 2008;1(2):1542-52. (Year: 2008).*
Du J, Cai Z, Ling CX. Cost-sensitive decision trees with prepruning. In Advances in Artificial Intelligence: 20th Conference of the Canadian Society for Computational Studies of Intelligence, Canadian AI 2007, Montreal, Canada, May 28-30, 2007. Proceedings 20 2007 (pp. 171-179). (Year: 2007).*
Dupont, M. et al., "Detecting Low-Quality Reference Time Series in Stream Recognition", 2016 23rd International Conference on Pattern Recognition (ICPR), Dec. 4-8, 2016, pp. 2556-2561, IEEE, United States.
Oregi, I. et al., "Nature-inspired Approaches for Distance Metric Learning in Multivariate Time Series Classification", 2017 IEEE Congress on Evolutionary Computation (CEC), Jul. 7, 2017, pp. 1992-1995, IEEE, United States.
Seto, S. et al., Multivariate Time Series Classification Using Dynamic Time Warping Template Selection for Human Activity Recognition, In 2015 IEEE Symposium Series on Computational Intelligence, Dec. 21, 2015, pp. 1399-1406, IEEE, United States.
Rai, S.N. et al., "Classification of biosensor time series using dynamic time warping: applications in screening cancer cells with characteristic biomarkers", Open Access Medical Statistics, Dec. 9, 2016, v. 2016 (6), pp. 21-29, PMC, United States.
International Search Report and Written Opinion dated Apr. 1, 2019 for International Application PCT/KR2018/016818 from Korean Intellectual Property Office, pp. 1-8, Republic of Korea.
Hu, B., et al., "Time Series Classification under More Realistic Assumptions," Proceedings of the 2013 SIAM International Conference on Data Mining, May 2, 2013, pp. 578-586, Society for Industrial and Applied Mathematics.
Hu, B., et al., "Classification of Multi-Dimensional Streaming Time Series by Weighting each Classifiers Track Record," IEEE 13th International Conference on Data Mining (ICDM), Dec. 7, 2013, pp. 281-290, IEEE, United States.
Hu, B., et al., "Classification of Streaming Time Series Under More Realistic Assumptions," Data mining and knowledge discovery, Jun. 3, 2015, vol. 30, No. 2, pp. 403-437, Springer, United States.
Gong, X. et al., "Fast Similarity Search of Multi-dimensional Time Series via Segment Rotation", International Conference on Database Systems for Advanced Applications, Apr. 20, 2015, pp. 108-124, Springer, United States.
Silva, D.F. et al., Speeding Up All-Pairwise Dynamic Time Warping Matrix Calculation, in Proceedings of the 2016 SIAM International Conference on Data Mining, Jun. 30, 2016, pp. 837-845, Society for Industrial and Applied Mathematics.
Extended European Search Report dated Dec. 8, 2020 for European Application No. 18896298.9 from European Patent Office. pp. 1-9, Munich, Germany.
Indian Examination Report dated May 4, 2022 for Indian Application No. 202037024882 from the Intellectual Property of India, pp. 1-5, Kolkata, India.

* cited by examiner

METHOD AND SYSTEM FOR CLASSIFYING TIME-SERIES DATA

CROSS-REFERENCE TO RELATED APPLICATIONS

This application claims the priority benefit of U.S. Provisional Patent Application No. 62/612,203, filed on Dec. 29, 2017, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments generally relate to time-series data classification and, in particular, to real-time classification of time-series data with different speeds.

BACKGROUND

Time-series data is ubiquitous in a variety of modern devices. Many mobile devices, such as smartphones, virtual reality headsets, smart watches, wearable devices, etc., are equipped with motion sensors, e.g., accelerometer sensors, gyroscope sensors, geomagnetic sensors, etc. These sensors usually indicate user movements and behaviors at each time point. Digital appliances, such as washing machines, dryers, etc., also generate a lot of time-series data such as the time-series data motion sensors, energy consumption, etc. This data monitors the device status over time. Various health related sensors are included in existing devices (e.g., heart rate (HR) sensors on both smartphones and smart watches) and potential future devices (electrocardiogram (ECG) sensors, galvanic skin response (GSR) sensors, etc.). The streaming data of these sensors can be used for an indication of a user's health or activity status. Futuristic virtual reality (VR) devices may be directly equipped with electroencephalogram (EEG) sensors to enable the brain-computer interaction between users and devices.

SUMMARY

One or more embodiments generally relate to classifying time-series data. In one embodiment, a recognition method includes retrieving an input including data of a first window size. The method further includes classifying the input based on comparison of warping distance of the input with a pruning threshold.

In some embodiments, an electronic device includes a memory storing instructions. At least one processor executes the instructions including a process configured to retrieve an input comprising data of a first window size; and classify the input based on comparison of warping distance of the input with a pruning threshold.

In one or more embodiments, a non-transitory processor-readable medium that includes a program that when executed by a processor performing a method that includes retrieving an input including data of a first window size. The method further includes classifying the input based on comparison of warping distance of the input with a pruning threshold.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

It should be noted that the terms "at least one of" refers to one or more than one of the elements that follow. For example, "at least one of a, b, c, or a combination thereof" may be interpreted as "a," "b," or "c" individually; or as "a" and "b" together in combination, as "b" and "c" together in combination; as "a" and "c" together in combination; or as "a," "b" and "c" together in combination.

One or more embodiments provide for real-time classifying of time-series data occurring at different speeds. Some embodiments include a method that includes retrieving an input including data of a first window size. The method further includes classifying the input based on comparison of warping distance of the input with a pruning threshold.

The analytics of time-series data have become a business driver to enable intelligent services on electronic devices (e.g., smart phones, smart devices, wearable devices, etc.). The analytics of motion sensors are helpful to recognize user actions or behaviors such that the device can either enable interactions with a user or provide personal assistance to users. For example, when the device recognizes a user performing a gesture when holding a virtual reality (VR) controller, the electronic device can control the VR system accordingly. In terms of health sensors, the electronic device can provide the continuous monitoring of a user's health status over time, e.g., heart status of cardiac patients. Such continuous and real-time monitoring can not only benefit the user, but also dramatically reduce the workload of doctors. The analytics of EEG signals can help the electronic device to directly understand the brain commands from a user, which can be used to control the electronic device directly.

Time-series data, however, are generated with different speeds. Users usually move with more or less different speeds even for one action, which leads to the different length of time-series data from, for example, motion sensors. Furthermore, two instances of each class/action could have different speeds in the certain parts of the entire time-series data, known as "warping." For example, when a user performs a shooting gesture in a VR game, the sub-action of raising the hand and another sub-action of shooting may have different speeds. Likewise, such speed differences also exist in biological sensors, e.g., EEG, ECG, etc.

A majority of time-series data may also be multi-dimensional data. Each motion sensor usually consists of different axes and the fusion of different motion sensors may be used altogether to detect each action of a user. Thus, the number of dimensions can reach more than 10. Both health sensors and EEG sensors are usually collected using multiple electrodes, in which each electrode collects one channel of data. For example, EEG signals can be composed of more than 256 channels. In some embodiments, a robust classification process that is invariant to such speed differences is described below. As a result, different instances of time-series data with respect to each action/class can be correctly classified (even if their speeds are very different).

In some embodiments, a real-time process classifies time-series data to enable intelligence on user's personal devices, such as gesture control on VR or smart TV, EEG based brain control, health monitoring and so on. The real-time process for classifying time-series data is designed to analyze the time-series streaming data with different speeds in real-time. During a training phrase, the real-time process acquires the labeled time-series training set via user specified classes (e.g., predefined gesture) to train a model that is robust to different speeds of each training sample. The training phase also derives a pruning threshold. During a testing/classification phrase, the real-time process designs an efficient lower bound computation for fast data pruning such that real-time classification results are provided. Using the real-time process, the number of costly warping distance computations can be largely reduced. The real-time process is designed as a generic framework that can enable real-time classification on various types of time-series data and various speed differences.

In some embodiments, the system (e.g., system 100, FIG. 2) is designed to process the large amount of time-series data in real-time by applying a pruning scheme onto the real-time streaming data. The system includes a low computational pruning scheme and classification model for supporting low power consumption for electronic devices (e.g., electronic device 120, FIG. 2). The system is designed for processing multi-dimensional time-series data, and achieves high accuracy for time-series classification processing.

Figure 1:
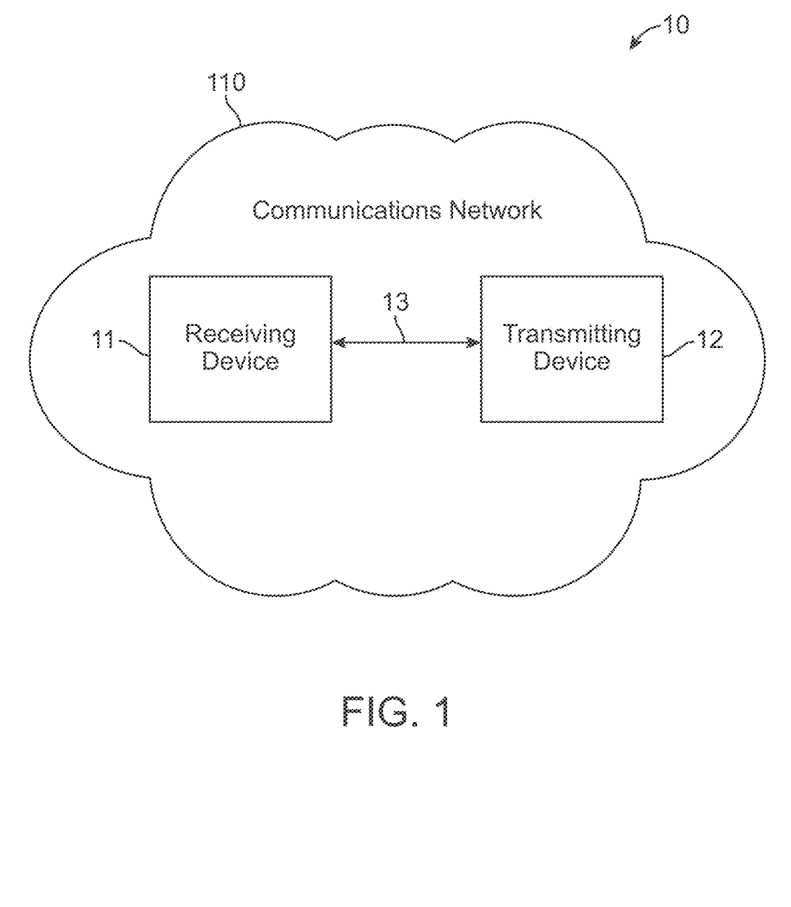
FIG. 1 shows a schematic view of a communications system, according to some embodiments.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing. Communications system 10 may form partially the training and real-time classification of time-series with different speeds framework, in one embodiment.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), BLUETOOTH®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a) BLACKBERRY®. Such protocols may include, for example, GSM, GSM plus EDGE, CDMA, quadband, and other cellular protocols. In another example, a long-range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include, but are not limited to mobile telephone devices, television (TV) systems, smart TV systems, cameras, camcorders, a device with audio video capabilities, tablets, wearable devices, smart appliances, smart picture frames, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., data and control messaging, e-mails, text messages, media messages), video communication, or combinations of these (e.g., video conferences).

Figure 2:
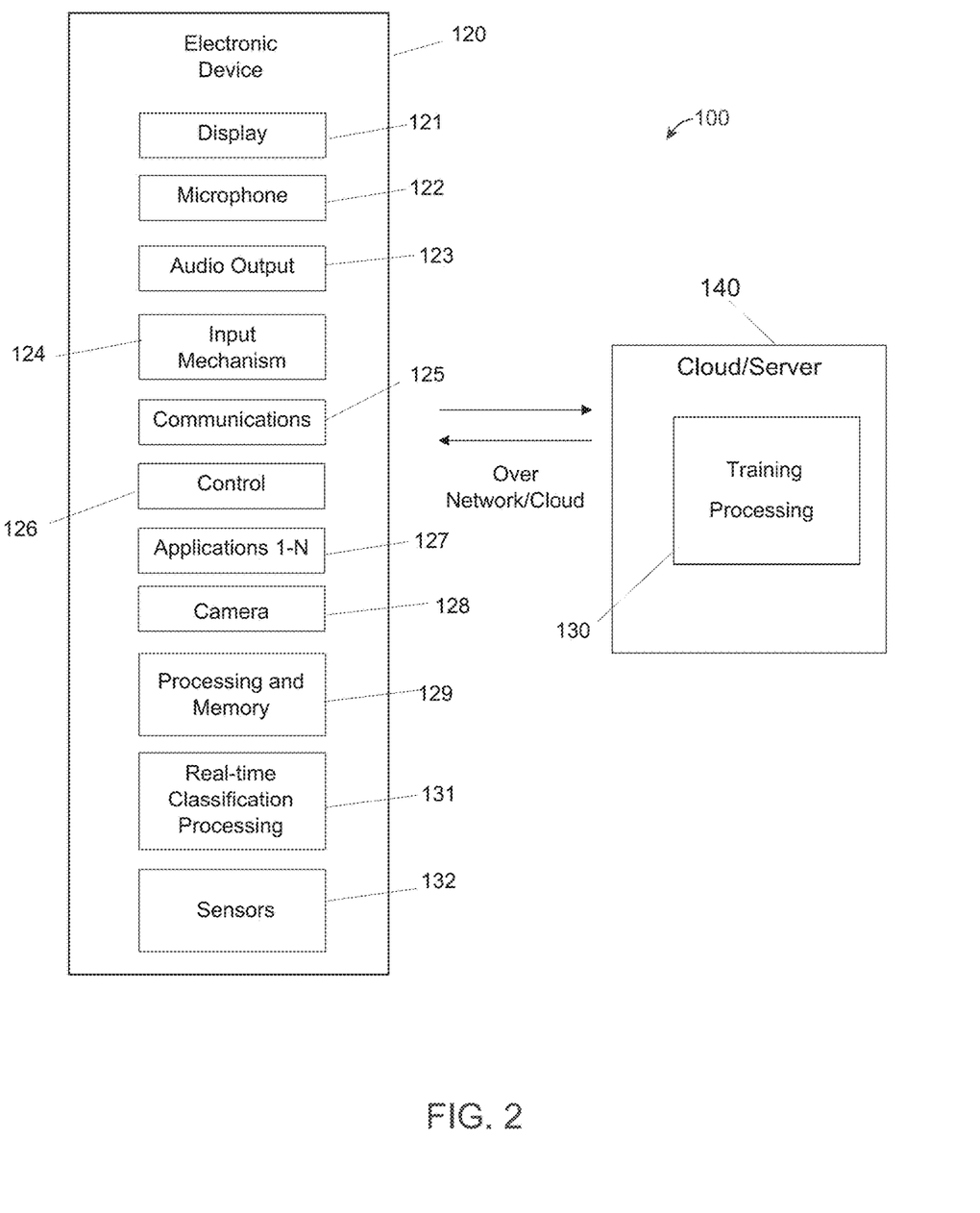
FIG. 2 shows a block diagram of architecture for a system including an electronic device and a cloud or server environment, that is capable of performing individually or in combination, time-series data classification based data processing, according to some embodiments.

FIG. 2 shows a block diagram of architecture for a system 100 including an electronic device 120 and a cloud or server 140 environment, that is capable of performing individually or in combination, time-series data classification-based data processing, according to some embodiments. In some embodiments, system 100 is capable of performing training and real-time classification of time-series with different speeds using: an electronic device 120 (e.g., mobile telephone devices, TV systems, cameras, camcorders, a device with audio video capabilities, tablets, pad devices, wearable devices, smart appliances, smart picture frames, smart lighting, etc.), a cloud or server 140 including training processing 130 (e.g., including training phase processing 310, FIG. 3), or a combination of the electronic device 120 and cloud computing (e.g., shared pools of configurable computing system resources and higher-level services, etc.) or server (e.g., a computer, device, or program that manages network resources, etc.) 140. Both the transmitting device 12 (FIG. 1) and receiving device 11 may include some or all of the features of the electronics device 120. In some embodiments, the electronic device 120 may comprise a display 121, a microphone 122, an audio output 123, an input mechanism 124, communications circuitry 125, control circuitry 126, a camera 128, processing and memory 129, real-time classification processing 131 (e.g., real-time classification phase processing 320, FIG. 3), sensors 132 (e.g., global positioning system (GPS) sensors, accelerometer sensors, gyroscope sensors, geomagnetic sensors, heart rate (HR) sensors, electrocardiogram (ECG) sensors, galvanic skin response (GSR) sensors, electroencephalogram (EEG) sensors, etc.), and may include any of the processing for, but not limited to, the examples as described below), and any other suitable components. Applications 1-N 127 are provided and may be obtained from a cloud or server 140, a communications network 110, (FIG. 1) etc., where N is a positive integer equal to or greater than 1.

In some embodiments, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In some embodiments, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., BLUETOOTH® headphones or a BLUETOOTH® headset).

In some embodiments, the display 121 may include any suitable screen or projection system for providing a display visible to the user. For example, display 121 may include a screen (e.g., an LCD screen, LED screen, OLED screen, etc.) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In some embodiments, input mechanism 124 may be any suitable mechanism or user interface for providing user inputs or instructions to electronics device 120. Input mechanism 124 may take a variety of forms, such as a button, keypad, dial, a click wheel, mouse, visual pointer, remote control, one or more sensors (e.g., a camera or visual sensor, a light sensor, a proximity sensor, etc.), or a touch screen. The input mechanism 124 may include a multi-touch screen, gesture control, voice recognition, etc.

In some embodiments, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOW, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the BLUETOOTH® protocol to couple the electronics device 120 with a BLUETOOTH® headset.

In some embodiments, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, one or more processors (e.g., in processing and memory 129) may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In some embodiments, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include applications 1-N 127 including, but not limited to: health tracking apps (e.g., physical fitness, heart monitoring, brain function monitoring, weight management, etc.), an automatic speech recognition (ASR) application, optical character recognition (OCR) application, a dialog application, a map application, a media application (e.g., Quick-Time, MobileMusic.app, or MobileVideo.app), social networking applications (e.g., FACEBOOK®, INSTAGRAM®, TWITTER®, etc.), a calendaring application (e.g., a calendar for managing events, appointments, etc.), an Internet browsing application, a recommender application, etc. In some embodiments, the electronics device 120 may include one or multiple applications operative to perform communications operations. For example, the electronics device 120 may include a messaging application, an e-mail application, a voicemail application, an instant messaging application (e.g., for chatting), a video-conferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In some embodiments, the camera module 128 comprises one or more camera devices that include functionality for capturing still and video images, editing functionality, communication interoperability for sending, sharing, etc. photos/videos, etc.

In some embodiments, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
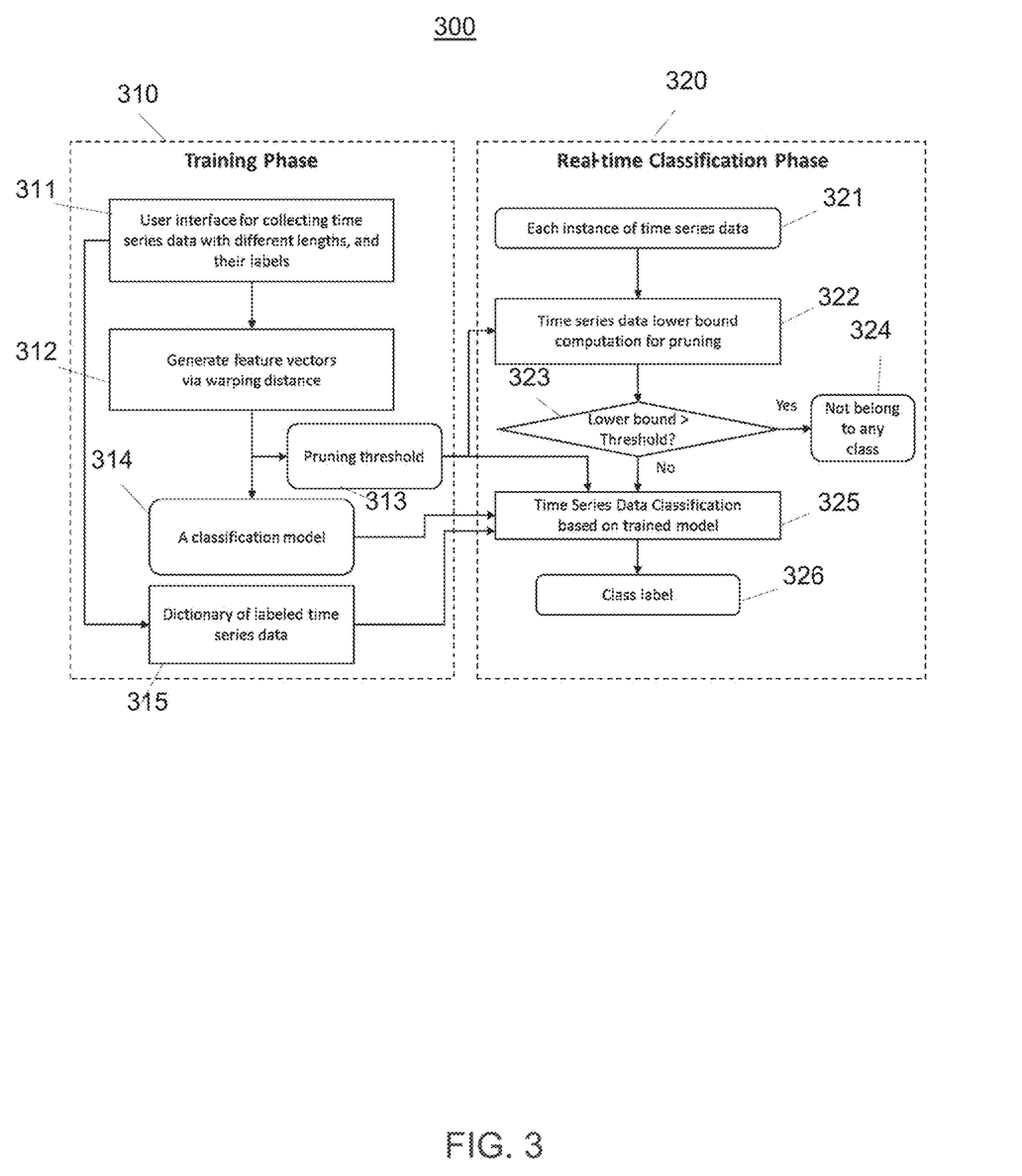
FIG. 3 shows a flow diagram of a system for real-time data classification for time-series data, according to some embodiments.

FIG. 3 shows a flow diagram 300 for real-time data classification for time-series data, according to some embodiments. In some embodiments, the flow diagram 300 includes the training phase 310 and the real-time classification (or testing) phase 320. In some embodiments, the training phase 310 processing is performed on the cloud/server 140 (FIG. 2) of a system (e.g., system 100, FIG. 2) and the real-time classification phase 320 processing is performed on an electronic device 120 (e.g., real-time classification processing 131, FIG. 2). The flow diagram 300 employed in a system enables real-time and accurate time-series processing and classification; then further automates the corresponding intelligent features based on the identified class. In some embodiments, the training phase 310 uses a user interface 311 for collecting time-series data with different lengths and their labels, feature vector generation processing 312 for generating feature vectors via warping distance, an output pruning threshold 313 is generated by the feature vector generation processing 312, a classification model 314 and dictionary 315 of labeled time-series data. In some embodiments, the real-time classification phase 310 uses time-series data input 321 including each instance of time-series data, time-series data lower bound computation 322 for pruning, determination processing 323 for determining whether the lower bound is greater than the pruning threshold (if so, an output 324 provides that the time-series data does not belong to any class), time-series classification processing 325 based on the trained classification model 314, and class label output 326.

In some embodiments, a user can interact with the user interface 311 to specify which classes of time-series they want to collect. In one example using gesture control, a user can define their personalized gesture and perform each gesture a few times to collect labeled data that is stored in the dictionary 315. The labeled data are associated with recognizable patterns. In some embodiments, the labeled data may be collected through voice input (e.g., converted to text, etc.), textual input (e.g., manually entered, obtained through scraping text, OCR, etc.), etc. In the training phase 310, the collected labeled data is used to determine the pruning threshold 313 and train the classification model 314 for recognizable patterns (first determine the pruning threshold 313; then train the model 314). The pruning threshold 313 is used during the real-time classification phase 320.

In some embodiments, during the real-time classification phase 320, each instance of time-series data is considered. The goal is to either identify the class label of the current instance or return that this instance does not belong to any class (in output 324). Since the large amount of data streaming is obtained continuously, efficient lower bound processing is designed for fast data pruning to determine if the current instance belongs to any of the defined classes. If it does, the trained classification model 314 is used to determine the actual class label 326 of this instance.

In some embodiments, the number of time-series data patterns the system is interested in is limited. Moreover, in practice most of the real-time data does not belong to any pattern. Thus, in some embodiments the lower bound will largely benefit the fast pruning of a large amount of real-time data. The majority of non-pattern data (not belonging to any recognizable pattern) can be quickly processed in the real-time classification phase 320.

In some embodiments, since the lower bound filters out most of the non-pattern time-series data, it is possible to provide finer real-time control by adding more adaptive and personalized patterns since the classification model 314 adaptation on a much smaller amount of time-series data is much more practically feasible. For example, in the use case of gesture control, there are four gesture classes (left, right, up, down) at the beginning. After deployment of the classification model 314, each user can add finer-grained personalized gestures under each class, such as one-finger left, two-fingers left, etc.

Figure 4:
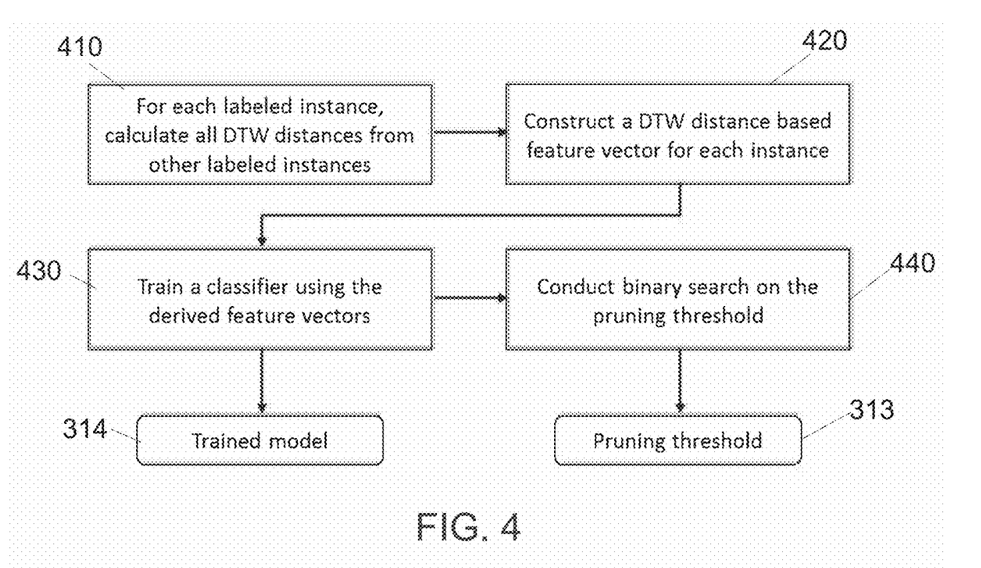
FIG. 4 shows a block diagram for data classification model training and pruning threshold learning, according to some embodiments.

FIG. 4 shows a block diagram for data classification model training and pruning threshold learning, according to some embodiments. In some embodiments, the training of the classification model 314 includes the following. In block 410, all labeled instances of time-series data is pre-processed by calculating their pairwise distance using dynamic time warping (DTW) to take into account the different speeds of each labeled time-series instance. The processing of block 410 results in the output to block 420 with construction of a DTW distance based feature vector for each labeled time-series instance. In block 430 a baseline classifier (e.g., the classification model 314) is trained, as a result, using the constructed/derived feature vectors of all labeled time-series instances. In block 440, a binary search is conducted to identify a pruning threshold 313 in order to maintain the accuracy of the classification processing.

In some embodiments, for each iteration t of the binary search for identifying the pruning threshold, the processing includes the following. The feature vectors before the first iteration are pruned using current threshold $\theta_{t-1}$, where the initial threshold $\theta_{t=0}$=(maximum value in feature vectors/2). Note that $\theta_{t=0}$=maximum value in feature vectors and $\theta_{t=1}$= (maximum value in feature vectors)/2. In the second round of iteration, $\theta_{t=2}$ is determined based on condition 1) below. The pruned feature vectors are divided to training pruned feature vectors (for training the classification model 314) and testing pruned feature vectors (for the trained classification model 314). The training pruned feature vectors are used to train the classification model 314. The trained classification model 314 is then tested using testing pruned feature vectors, to obtain accuracy $A_t$. The baseline classification model is tested using testing pruned feature vectors, to obtain accuracy $A_t^b$. The following processing is then performed to determine the pruning threshold value:

1) If $|A_t - A_t^b| < \gamma$, $\theta_t = \theta_{t-1}/2$, otherwise $\theta_t = (\theta_{t-1} + \theta_{t-2})/2$ 2) Terminate the iteration if $|A_t - A_t^b| > \gamma$ and $|A_{t-1} - A_{t-1}^b| < \gamma$.

When a larger $\gamma$ is selected, one or more embodiments are more accurate. On the other hand, when a smaller $\gamma$ is selected, one or more embodiments will execute faster. Thus, the selection of $\gamma$ trades off the running time and performance. Note that the pruning threshold 313 is learned based on the training data, the labeled instances of time-series data. When the training data changes, the pruning threshold 313 could change dramatically.

Figure 5:
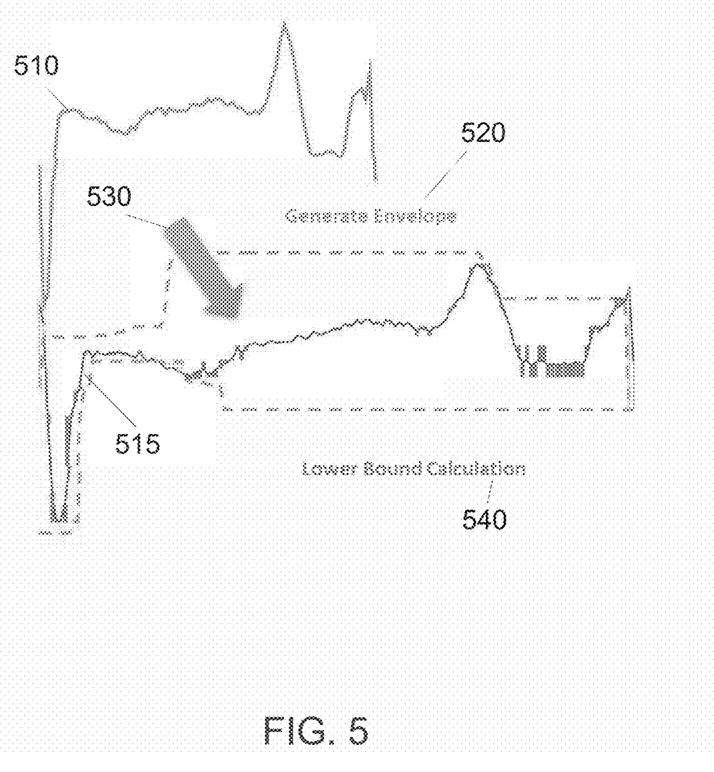
FIG. 5 shows an example graph for envelope based lower bound determination using a training instance and a query instance, according to some embodiments.

FIG. 5 shows an example graph for envelope based lower bound determination 540 using a training instance and a query instance, according to some embodiments. The graph 510 is the training time-series instance, and the graph 515 is the query time-series instance. In some embodiments, for the time-series data pruning, one goal of this processing is to determine a computational efficient lower bound to prune the irrelevant time-series instances (i.e., those instances that do not belong to any classes). A time-series instance is pruned (labeled to no class as output 324, FIG. 3) if its DTW distance from each labeled time-series instance in the dictionary 315 (FIG. 3) is larger than the pruning threshold 313. In terms of the comparison of each labeled time-series instance in the dictionary 315 (referred to as dictionary 315 instances), the lower bound processing performs the following. Generate envelope processing 520 of the training instance 510 results in the envelope 530. The lower bound calculation processing 540 calculates the lower bound between the query instance 515 and the prefix (maximal speed difference between the query instance 515 and the dictionary instances 315) of the dictionary 315 instance (where the dictionary instances 315 are the training data) using LB_keogh lower bound, in one embodiment. For each of the following sample points in the dictionary 315 time-series instances, increment the lower bound by adding the smallest distance between this sample point and the corresponding envelope in the query instance 515. If this lower bound is larger than the pruning threshold 313, return infinity (or a large number). Otherwise, calculate the actual DTW between two dictionary 315 time-series instances and return the actual DTW. If all DTW distances of a time-series instance are infinity (or a large number), label this time instance as a non-class time-series instance (if all DTW is larger than the pruning threshold, the query belongs to a non-class; otherwise the classifier is used for the next iteration)

In some embodiments, for the lower bound calculation processing 540, given a training instance q=(q$_1$, ..., q$_m$), its envelope is defined as follows:

$$q_j^{USDTW} = (q_{max(1,[j/l]-r)} \cdots q_{min(1,[j/l]+r,m)})$$

where r is the DTW constraint parameter between q and a query instance c of fixed length n; l is the scaling parameter (meaning the maximum length lm a real-time query time-series instance c can be), m is the length of training instance and q$_j$ is the index of the jth element in q. Then, the lower bound between training q and the query c is computed as follows:

$$LB\text{-}UD_{new} = \Sigma_{j=1}^{min([lm],n)} \delta(c_j, q_j^{USDTW})$$

Where n is the length of query c. The lower bound calculation processing 540 can be summarized as follows. Construct the envelope of training time-series instance q; calculate the lower bound for the shortest prefix of c and q; and calculate the lower bound incrementally until reaching the maximum length lm of the time-series instance c.

Figure 6:
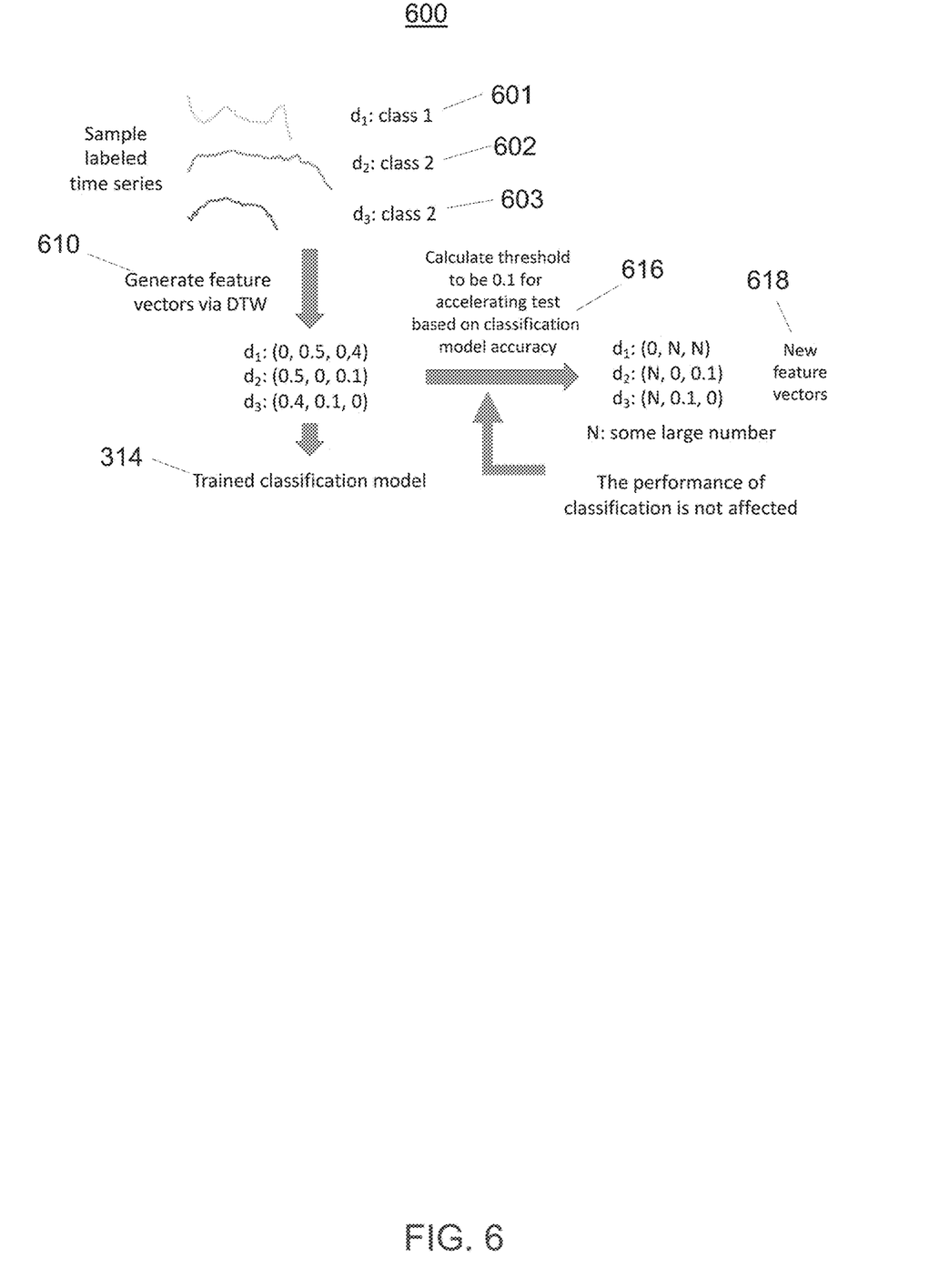
FIG. 6 shows a running example of a training phase for time-series data classification, according to some embodiments.

FIG. 6 shows a running example 600 of a training phase for time-series data classification, according to some embodiments. In the example 600, the sample labeled time-series data include classes 601, 602 and 603. The training processing includes generation of the feature vectors 610 of the current time-series instance by using the mixed DTW distances from the time-series data pruning processing; and using the feature vector and the trained classification model 314 in the training phase 320 to infer the class label. In each generated feature vector $d_i$, the $j^{th}$ element is the DTW distance between training time series sample $d_i$ and $d_j$. Based on the trained classification model 314 accuracy, the pruning threshold 616 is calculated to be 0.1 (in this example 600) for accelerating the testing. The new feature vectors 618 result from the time-series data pruning processing, where N is some large number.

Figure 7:
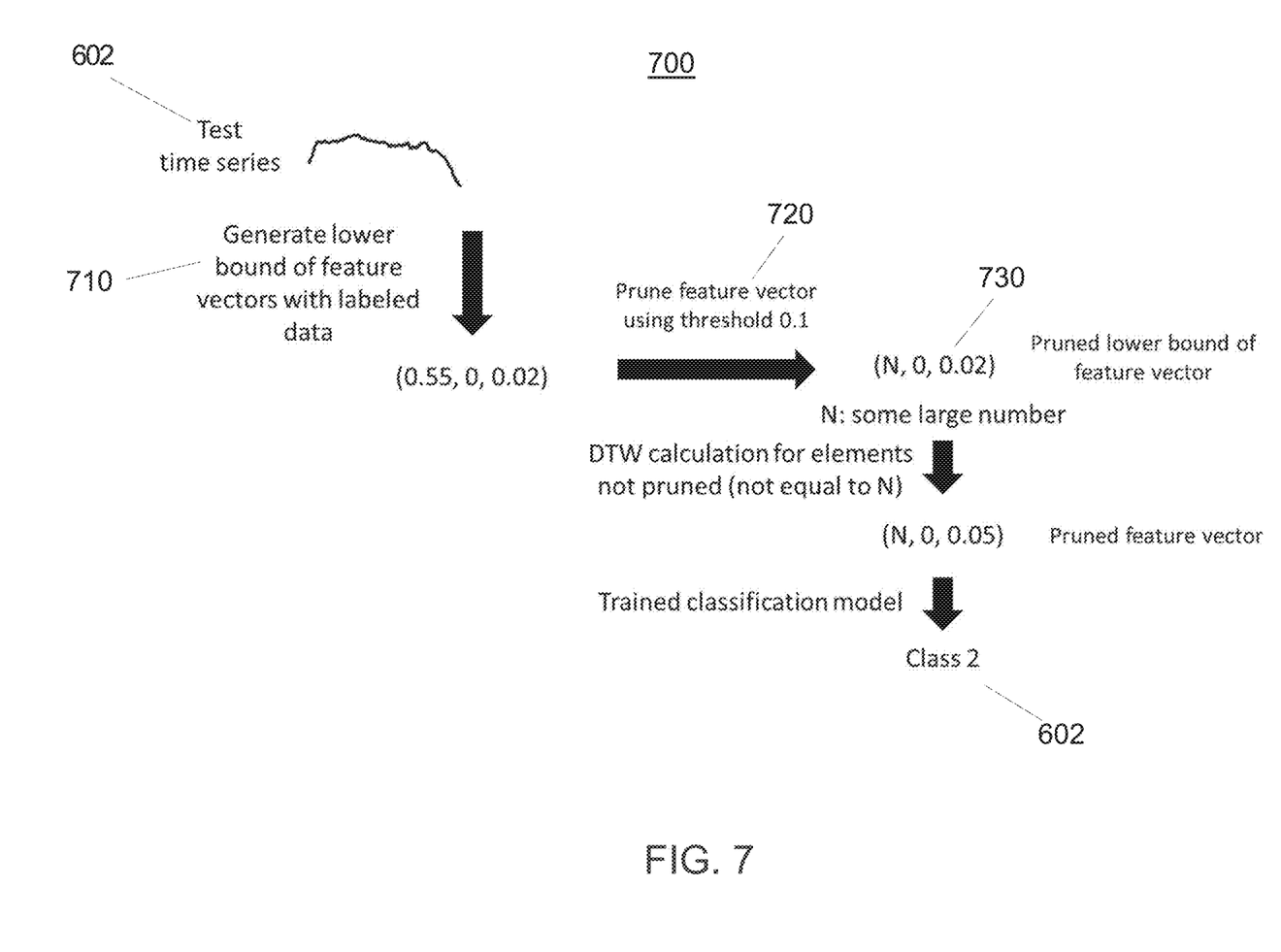
FIG. 7 shows a running example of real-time data classification (testing) phase for time-series data, according to some embodiments.

FIG. 7 shows a running example 700 of the real-time data classification (testing) phase for time-series data class 602, according to some embodiments. The testing of the current data is based on both the trained classification model 314 (FIGS. 3 and 4) and the above derived DTW distances (mixture of lower bound distances and actual DTW distances). For the testing the time-series data class 602, the processing generates the lower bound 710 of feature vectors with labeled data (in example 700, (0.55,0,0.02). Then prune feature vector processing 720 prunes this lower bound feature vector using the trained threshold 0.1, which generates a new pruned lower bound of feature vector (N,0,0.02) (where N is some large number). For each of the elements (not equal to N) that are not pruned in the pruned lower bound of feature vector, the processing further calculates their actual DTW distance and generates the final new feature vector 730. If all elements in the pruned feature vector are N, this new time series data does not belong to any classes. Otherwise, the new feature vectors 730 are used with the classification model 314 to perform classification of labeled time-series data class 602.

In some embodiments, the classification of time-series data over a period, for example two years, using the system 100 (FIG. 2) employing processing similar to flow diagram 300 (FIG. 3) can reduce the computations from 10.08 hours with conventional classification systems with DTW to 2.5 hours with system 100 (maintain the same accuracy, e.g., 0.96). For example ECG time-series data sets collected over 20 hours, the conventional classification systems with DTW would take approximately 83.24 hours (with 0.91 accuracy)

while the system 300 would take approximately 3.03 hours (with 0.90 accuracy). Existing approaches cannot achieve real-time monitoring.

In some embodiments, system 100 (FIG. 2) employing flow diagram 300 (FIG. 3) processing may be employed for gesture control for virtual reality (VR) or smart TVs using motion sensors: the system 100 can be used to allow users to use their gestures to interact with various devices. When a user performs the same gesture with different speeds (either overall or partial gestures), system 100 can identify the label of this gesture and provide the corresponding action.

In one or more embodiments, system 100 (FIG. 2) employing flow diagram 300 (FIG. 3) processing may be employed for brain computer interfacing using EEG: when a user has some brain activities, the generated signal usually suffers from different speeds. System 100 can be used for such speed differences in time-series data and derive the actual class of each instance.

In some embodiments, system 100 (FIG. 2) employing flow diagram 300 (FIG. 3) processing may be employed for health monitoring: system 100 can be used to monitor user's health (e.g., via ECG signals for cardiac patients or normal users during different activities). The derived results will reflect if the user has a good health status or encounters some abnormal cases that need to be treated immediately. System 100 helps to reduce doctor's labor and provides real-time alarms. For example, in cardiac disease monitoring, the pattern (shape) of ECG data corresponding to the same disease (e.g., premature ventricular contraction) is the same regardless of a user's status (e.g., running or sitting). However, the speeds of the time-series data are different based on a user's status (e.g., faster when running; slower when sitting, etc.). System 100 can categorize the different speed time-series into the same class in real-time. This enables real-time classifying/monitoring of the disease when a user has different status.

In one or more embodiments, system 100 (FIG. 2) employing flow diagram 300 (FIG. 3) processing may be employed for digital appliance service: system 100 can be applied for many applications, such as: automatic configuration: for example, when a user uses a washing machine with higher loads, system 100 can automatically detect, based on the vibration of the machine, and adjust the loading configuration to "heavy"; automatic troubleshooting: for example, system 100 can be used to detect malfunctioning of a washing machine based on noise patterns. When the washing machine is shaking heavily, system 100 can be used to identify the problem using noise patterns in different situations (e.g., different loads, different places, etc.). Thus, there is no need to assign technicians to be on site and largely reduces the cost; optimization of energy consumption: for example, when a user turns on the washing machine, system 100 can be used to automatically identify the best timing to launch it such that the least energy will be consumed. As a result, the user can benefit from money savings due to the saved energy.

Figure 8:
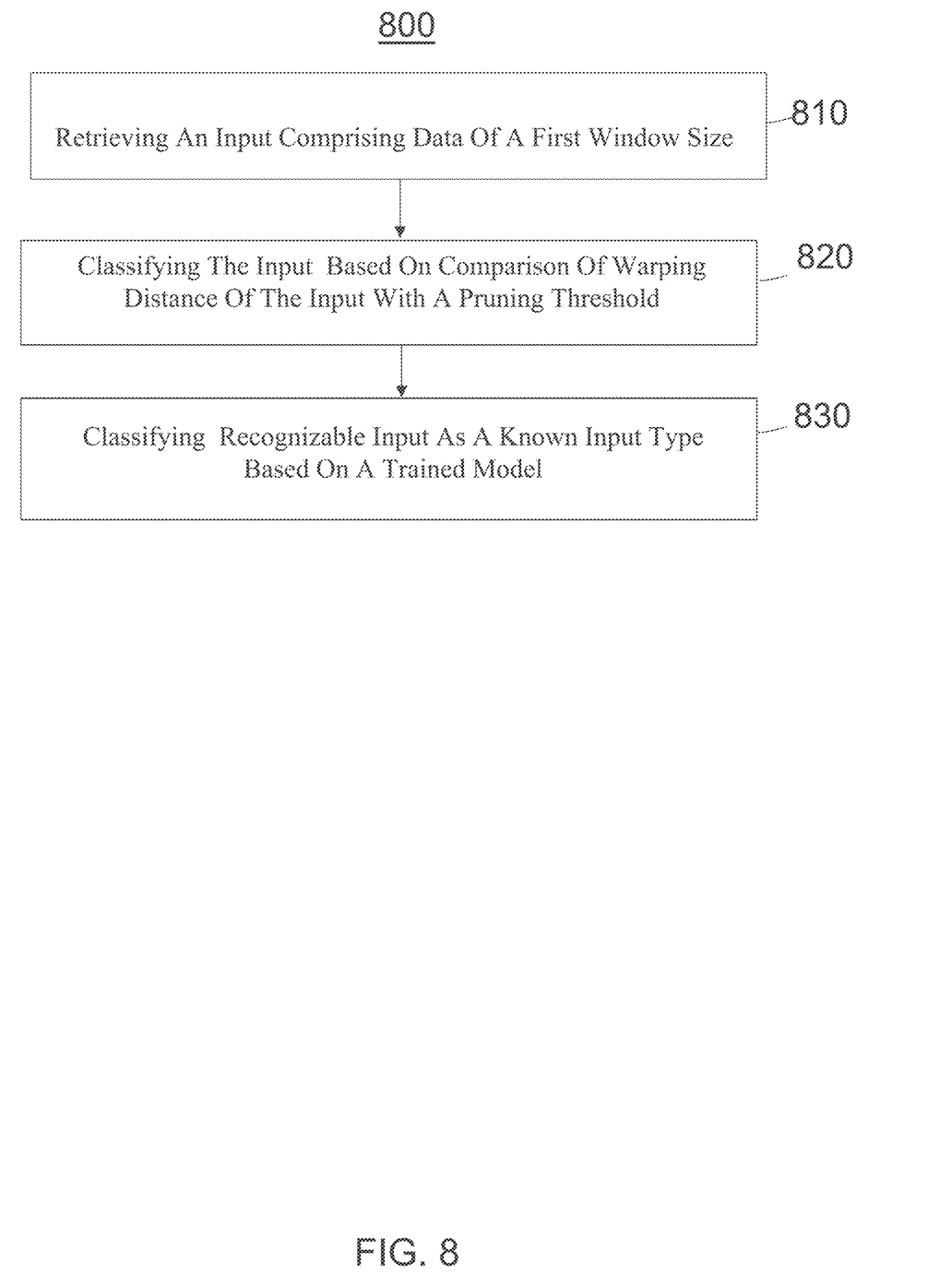
FIG. 8 shows a block diagram of a process for time-series data classification, according to some embodiments.

FIG. 8 shows a block diagram of a process 800 for time-series data classification processing, according to some embodiments. In some embodiments, block 810 of process 800 provides retrieving (e.g., by obtaining sensed information using a sensor of an electronic device (e.g., electronic device 120, FIG. 2)) an input including data (e.g., time-series data) of a first window size. In block 820, process 800 classifies the input (e.g., recognizable labeled instance of time-series data or unrecognizable time-series data) based on comparison of warping distance of the input with a pruning threshold (e.g., pruning threshold 313, FIGS. 3 and 4). In block 830, process 800 classifies the recognizable input as a known input type (e.g., a known class) based on a trained model (e.g., trained model 314, FIGS. 3-4). In some embodiments, the known input type comprises a series of data of a second window size, and the first window size differs from the second window size.

In some embodiments, process 800 includes the trained model that is trained based on one or more recognizable inputs from a user (e.g., gestures, biological signals (e.g., EEG, ECG, heart rate, etc.)), and each recognizable input includes multiple instances including data of various window sizes (e.g., a minute, an hour, a day, a month, a year, etc.). The input includes multi-dimensional data (e.g., time-series data) captured by multiple sensors (e.g., sensors 132, FIG. 2) of one or more electronic devices (e.g., electronic devices 120, FIG. 2).

In some embodiments, in process 800 the trained model classifies a computed warping distance for each recognizable input against other recognizable inputs of the one or more recognizable inputs. The recognizable input is an instance of time-series data. Classifying the recognizable input includes applying a label (e.g., a class label) for the instance of time-series data. Determining that the input includes recognizable input includes pre-processing all labeled instances of time-series data (e.g., in the training phase 310, FIG. 3, processing of FIG. 4) by determining their pairwise distance using warping distance to take into account different speeds of each labeled time-series instance.

In some embodiments, in process 800 the pruning threshold is learned based on training data. The input data includes time-series data based on monitoring biological signals (e.g., EEG, ECG, heart rate, gestures, etc.) occurring at different speed that are sensed with the sensor over various window sizes. The input data may include time-series data based on monitoring device signals (e.g., sound signals, vibration signals, etc.) occurring at different speed that are sensed with the sensor over various window sizes.

Figure 9:
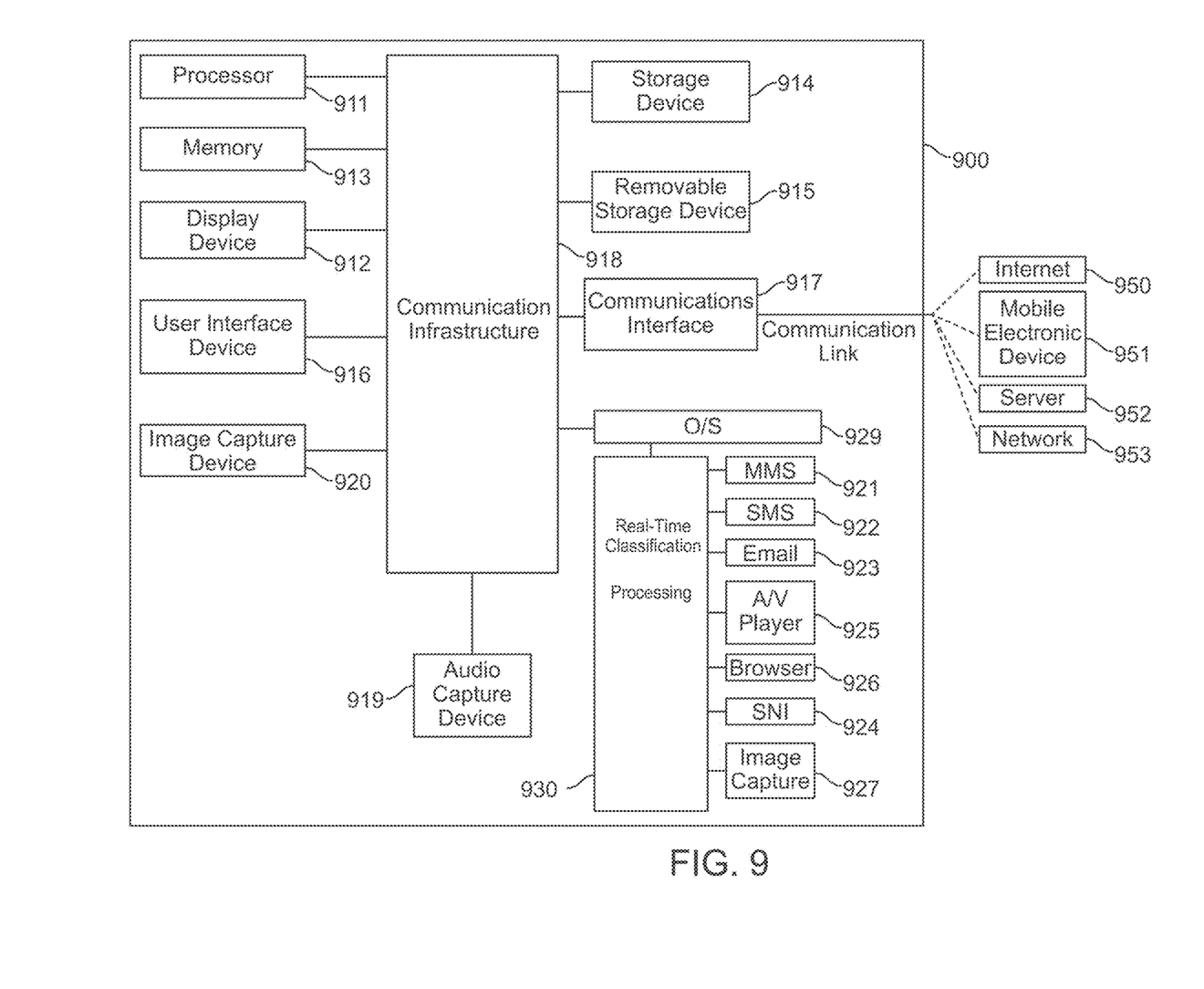
FIG. 9 is a high-level block diagram showing an information processing system comprising a computing system implementing one or more embodiments.

FIG. 9 is an exemplary high-level block diagram showing an information processing system comprising a computing system implementing one or more embodiments. The system 900 includes one or more processors 911 (e.g., ASIC, CPU, etc.), and may further include an electronic display device 912 (for displaying graphics, text, and other data), a main memory 913 (e.g., random access memory (RAM), cache devices, etc.), storage device 914 (e.g., hard disk drive), removable storage device 915 (e.g., removable storage drive, removable memory, a magnetic tape drive, optical disk drive, computer-readable medium having stored therein computer software and/or data), user interface device 916 (e.g., keyboard, touch screen, keypad, pointing device), and a communication interface 917 (e.g., modem, wireless transceiver (such as Wi-Fi, Cellular), a network interface (such as an Ethernet card), a communications port, or a PCMCIA slot and card).

The communication interface 917 allows software and data to be transferred between the computer system and external devices through the Internet 950, mobile electronic device 951, a server 952, a network 953, etc. The system 900 further includes a communications infrastructure 918 (e.g., a communications bus, cross bar, or network) to which the aforementioned devices 911 through 917 are connected.

The information transferred via communications interface 917 may be in the form of signals such as electronic, electromagnetic, optical, or other signals capable of being received by communications interface 917, via a communication link that carries signals and may be implemented using wire or cable, fiber optics, a phone line, a cellular phone link, a radio frequency (RF) link, and/or other communication channels.

In one implementation of one or more embodiments in an electronic device (e.g., electronic device 120, FIG. 2), the system 900 further includes an image capture device 920, such as a camera 128 (FIG. 2), and an audio capture device 919, such as a microphone 122 (FIG. 2). The system 900 may further include application processing or processors as MMS 921, SMS 922, email 923, social network interface (SNI) 924, audio/video (AV) player 925, web browser 926, image capture 927, etc.

In one embodiment, the system 900 includes real-time classification processing 930 that may implement processing similar as described regarding real-time (time-series for different speeds) classification processing 131 and/or training phase processing 130 (FIG. 2), and process 800 (FIG. 8) as described above. In one embodiment, the real-time classification processing 930 along with an operating system 929 may be implemented as executable code residing in a memory of the system 900. In another embodiment, the real-time classification processing 930 may be provided in hardware, firmware, etc.

In one embodiment, the main memory 913, storage device 914 and removable storage device 915, each by themselves or in any combination, may store instructions for the embodiments described above that may be executed by the one or more processors 911.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A recognition method, comprising:
   receiving, by an electronic device, an input comprising data over a first window size;
   training, by the electronic device, a classification model using training pruned feature vectors from pruned feature vectors of training data;
   performing testing processing, by the electronic device, of the trained classification model using testing pruned feature vectors from pruned feature vectors of the data to obtain classification model accuracy, wherein the classification model classifies the input based on comparison of warping distance of the input with a pruning threshold; and
   performing testing processing, by the electronic device, of a baseline classification model using the testing pruned feature vectors to obtain baseline classification model accuracy, wherein the pruning threshold is based on the classification model accuracy and the baseline classification model accuracy.

2. The recognition method of claim 1, further comprising:
   classifying recognizable input as a known input type based on the trained classification model;
   wherein:
   the known input type comprises data over a second window size; and
   the first window size differs from the second window size.

3. The recognition method of claim 2, wherein:
   the trained classification model is trained based on one or more recognizable inputs from a user; and each recognizable input includes multiple instances comprising data over various window sizes.

4. The recognition method of claim 3, wherein the trained classification model classifies a computed warping distance for each recognizable input against other recognizable inputs of the one or more recognizable inputs.

5. The recognition method of claim 2, wherein the input comprising multi-dimensional data captured by a plurality of sensors of one or more electronic devices.

6. The recognition method of claim 2, wherein classifying recognizable input comprises pre-processing all labeled instances of time-series data by determining their pairwise distance using warping distance to take into account different speeds of each labeled time-series instance, and the pruning threshold is iteratively learned using the training data comprising labeled instances of time-series data.

7. The recognition method of claim 1, wherein the data comprises multi-dimensional time-series data, and a time-series instance is labeled to no class if its computed warping distance from each labeled time-series instance is larger than the pruning threshold.

8. The recognition method of claim 1, wherein the data comprises time-series data based on monitoring biological signals occurring at different speed that are sensed with a sensor over various window sizes.

9. The recognition method of claim 1, wherein the input data comprises time-series data based on monitoring device signals occurring at different speed that are sensed with a sensor over various window sizes.

10. An electronic device comprising:
a memory storing instructions; and
at least one processor executing the instructions including a process configured to:
receive an input comprising data over a first window size;
train a classification model using training pruned feature vectors from pruned feature vectors of training data;
perform testing processing of the trained classification model using testing pruned feature vectors from pruned feature vectors of the data to obtain classification model accuracy, wherein the classification model classifies the input based on comparison of warping distance of the input with a pruning threshold; and
perform testing processing of a baseline classification model using the testing pruned feature vectors to obtain baseline classification model accuracy, wherein the pruning threshold is based on the classification model accuracy and the baseline classification model accuracy.

11. The electronic device of claim 10, wherein the process is further configured to:
classify the recognizable input as a known input type based on the trained classification model, the known input type comprises a series of data of a second window size; and
the first window size differs from the second window size.

12. The electronic device of claim 11, wherein:
the trained classification model is trained based on one or more recognizable inputs from a user;
each recognizable input includes multiple instances comprising data of various window sizes; and
the input comprising multi-dimensional data captured by a plurality of sensors of one or more electronic devices.

13. The electronic device of claim 12, wherein:
the trained classification model classifies a computed warping distance for each recognizable input against other recognizable inputs of the one or more recognizable inputs;
the data comprises multi-dimensional time-series data;
classifying the recognizable input comprises applying a label for the instance of time-series data; and
a time-series instance is labeled to no class if its computed warping distance from each labeled time-series instance is larger than the pruning threshold.

14. The electronic device of claim 13, wherein the process is further configured to:
pre-process all labeled instances of time-series data by determining their pairwise distance using warping distance to take into account different speeds of each labeled time-series instance; and
iteratively learn the pruning threshold using the training data comprising labeled instances of time-series data.

15. The electronic device of claim 10, wherein the data comprises time-series data based on monitoring one of biological or device signals occurring at different speed that are sensed with the sensor over various window sizes.

16. A non-transitory processor-readable medium that includes a program that when executed by a processor performing a method comprising:
receiving, by the processor, an input comprising data of a first window size;
training, by the processor, a classification model using training pruned feature vectors from pruned feature vectors of training data;
performing, by the processor, testing processing of the trained classification model using testing pruned feature vectors from pruned feature vectors of the data to obtain classification model accuracy, wherein the classification model classifies the input based on comparison of warping distance of the input with a pruning threshold; and
performing, by the processor, testing processing of a baseline classification model using the testing pruned feature vectors to obtain baseline classification model accuracy, wherein the pruning threshold is based on the classification model accuracy and the baseline classification model accuracy.

17. The non-transitory processor-readable medium of claim 16, wherein the method further comprises:
classifying recognizable input as a known input type based on the trained classification model, wherein:
the known input type comprises a series of data of a second window size; and
the first window size differs from the second window size.

18. The non-transitory processor-readable medium of claim 17, wherein:
the trained classification model classifies a computed warping distance for each recognizable input against other recognizable inputs of the one or more recognizable inputs;
the trained classification model is trained based on one or more recognizable inputs from a user;
each recognizable input includes multiple instances comprising data of various window sizes;
the input comprising multi-dimensional data captured by a plurality of sensors of one or more electronic devices;
the data comprises multi-dimensional time-series data;
classifying the recognizable input comprises applying a label for the instance of time-series data; and a time-series instance is labeled to no class if its computed warping distance from each labeled time-series instance is larger than the pruning threshold.

19. The non-transitory processor-readable medium of claim 18, wherein the method further comprises:

pre-processing all labeled instances of time-series data by determining their pairwise distance using warping distance to take into account different speeds of each labeled time-series instance; and iteratively learning the pruning threshold using the training data comprising labeled instances of time-series data.

20. The non-transitory processor-readable medium of claim 16, wherein the data comprises time-series data based on monitoring one of biological signals or device signals occurring at different speed that are sensed with a sensor over various window sizes.

\* \* \* \* \*